(12) United States Patent
Han

(10) Patent No.: US 12,430,610 B2
(45) Date of Patent: Sep. 30, 2025

(54) ELECTRONIC APPARATUS AND CONTROL METHOD THEREOF

(71) Applicant: SAMSUNG ELECTRONICS CO., LTD., Suwon-si (KR)

(72) Inventor: Seongjoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 317 days.

(21) Appl. No.: 18/076,105

(22) Filed: Dec. 6, 2022

(65) Prior Publication Data

US 2023/0214769 A1 Jul. 6, 2023

Related U.S. Application Data

(63) Continuation of application No. PCT/KR2022/014121, filed on Sep. 21, 2022.

(30) Foreign Application Priority Data

Jan. 6, 2022 (KR) .................. 10-2022-0002027

(51) Int. Cl.
*G06Q 10/087* (2023.01)
*G06T 5/70* (2024.01)
(Continued)

(52) U.S. Cl.
CPC .......... *G06Q 10/087* (2013.01); *G06T 5/70* (2024.01); *G06V 10/44* (2022.01); *G06V 10/761* (2022.01);
(Continued)

(58) Field of Classification Search
CPC ...... G06Q 10/087; G06Q 10/06; G06Q 10/08; G06Q 10/10; G06Q 10/06315;
(Continued)

(56) References Cited

U.S. PATENT DOCUMENTS 10,325,181 B2 * 6/2019 Xu .................. G06F 18/2414
2016/0021342 A1 1/2016 Aso et al.
(Continued)

FOREIGN PATENT DOCUMENTS

EP 3543630 A1 9/2019
JP 6550696 B2 7/2019
(Continued)

OTHER PUBLICATIONS

International Search Report 9PCT/ISA/210) issued Jan. 20, 2023 by the International Searching Authority in counterpart International Application No. PCT/KR2022/014121.
(Continued)

*Primary Examiner* — Garcia Ade
(74) *Attorney, Agent, or Firm* — Sughrue Mion, PLLC

(57) ABSTRACT

An electronic apparatus is disclosed. The electronic apparatus includes: electronic apparatus including: a storage compartment; a camera; a memory configured to store a database corresponding to products provided in the storage compartment; and a processor communicably coupled to the camera and the memory to control the electronic apparatus, wherein the processor is configured to: control the camera to capture images of one side of the storage compartment; based on identifying that a first product is input to the storage compartment, obtain a first feature of the first product; update the database by storing the first feature in the memory; based on identifying that a second product is output from the storage compartment, obtain a second feature of the second product; identify a product corresponding to the second feature from the database; and update the database based on the product corresponding to the second feature.

20 Claims, 13 Drawing Sheets

(51) Int. Cl.
*G06V 10/44* (2022.01)
*G06V 10/74* (2022.01)
*G06V 10/82* (2022.01)

(52) U.S. Cl.
CPC .... *G06V 10/82* (2022.01); *G06T 2207/10024* (2013.01); *G06T 2207/20081* (2013.01); *G06V 2201/07* (2022.01)

(58) Field of Classification Search
CPC .................. G06Q 10/0875; G06T 5/70; G06T 2207/10024; G06T 2207/20081; G06T 7/11; G06T 7/70; G06V 10/44; G06V 10/761; G06V 10/82; G06V 2201/07; G06V 10/764; G06V 20/20; G06V 20/52; G06N 3/08; H04N 7/18
USPC ......................................................... 705/28
See application file for complete search history.

(56) References Cited

U.S. PATENT DOCUMENTS

| | | | |
|---|---|---|---|
| 2016/0088262 A1* | 3/2016 | Lee .......................... | G06F 3/167 704/275 |
| 2016/0221342 A1* | 8/2016 | Tanaka ................. | B41J 2/16535 |
| 2019/0156277 A1* | 5/2019 | Fisher ....................... | G06N 3/08 |
| 2019/0384990 A1 | 12/2019 | Kim et al. | |
| 2021/0312206 A1 | 10/2021 | Meidar et al. | |
| 2022/0284384 A1* | 9/2022 | Chaubard .............. | G06V 20/52 |
| 2024/0037905 A1* | 2/2024 | Hamedi ............... | G06V 10/761 |

FOREIGN PATENT DOCUMENTS

| | | |
|---|---|---|
| JP | 6673498 B2 | 3/2020 |
| JP | 202171237 A | 5/2021 |
| KR | 10-2014-0081267 A | 7/2014 |
| KR | 10-2014145 B1 | 8/2019 |
| KR | 10-2017980 B1 | 9/2019 |
| KR | 10-2021-0068747 A | 6/2021 |
| KR | 10-2328081 B1 | 11/2021 |
| WO | 2014168265 A1 | 10/2014 |

OTHER PUBLICATIONS

Written Opinion (PCT/ISA/210) issued Jan. 20, 2023 by the International Searching Authority in counterpart International Application No. PCT/KR2022/014121.
Extended European Search Report dated Oct. 18, 2024, issued by the European Patent Office in European Application No. 22918974.1.
Lee et al., "Smart Refrigerator Inventory Management Using Convolutional Neural Networks", IEEE, 2021 (4 pages total).
Islam et al., "Colour, Texture, and Shape Features based Object Recognition Using Distance Measures", I. J. Engineering and Manufacturing, 2021, vol. 11, Issue. 4, pp. 42-50 (9 pages total).
Singh et al., "Geometrically invariant color, shape and texture features for object recognition using multiple kernel learning classification approach", Information Sciences, 2019, vol. 484, pp. 135-152 (18 pages total).
Chen et al., "Image Retrieval based on Multi-Feature Similarity Score Fusion Using Genetic Algorithm", IEEE, 2010, vol. 2, pp. 46-49 (4 pages total).
Shrivastava et al., "An efficient technique for retrieval of color images in large databases", Computers and Electrical Engineering, 2015, vol. 46, pp. 314-327 (14 pages total).

* cited by examiner

ELECTRONIC APPARATUS AND CONTROL METHOD THEREOF

CROSS-REFERENCE TO RELATED APPLICATION(S)

This application is a bypass continuation of International Application No. PCT/KR2022/014121, filed on Sep. 21, 2022, which is based on and claims priority to Korean Patent Application No. 10-2022-0002027, filed on Jan. 6, 2022, in the Korean Intellectual Property Office, the disclosures of which are incorporated by reference herein in their entireties.

BACKGROUND

1. Field

The disclosure relates to an electronic apparatus and a control method thereof, and more particularly, to an electronic apparatus which provides a service for automatically managing input and output of products, and a control method thereof.

2. Description of Related Art

Along with the development of electronic technologies, electronic apparatuses providing various functions are being developed. Particularly, in recent years, an electronic apparatus which manages products stored inside the electronic apparatus such as a refrigerator is being developed.

A related method for managing stock includes recognizing products in a simple tagging manner using barcode information attached to the products and this is useful in a large-scaled warehouse or a distribution system. However, the related method requires barcodes be attached to household appliances such as general consumer goods and the related method cannot identify a product if there is no barcode.

Another related method uses a detecting sensor (e.g., camera, RFID, or the like) mounted on an apparatus. Specifically, the method manages stock by detecting/recognizing input products through a camera or an additional sensor mounted on an apparatus. However, a device such as an RFID or the like is requires the use of the additional sensor every time an item is moved, which causes increased processing power and size, and fails at recognizing stored products that are blocked or obstructed.

In yet another related method, a neural network model may be used during a product recognition process. However, the related neural network model needs to be trained preliminarily in order to recognize a state where various products are mixed, and collection of a large amount of training data and repeated additional collection and retraining are necessary for this. Further, an image shape varies with different poses at time of the input and the output, and accordingly, image training for all poses is necessary in advance, and this requires a large amount of storage, and processing, resulting in high cost.

Therefore, there is a need for an improved product management method which addresses one or more of the aforementioned problems.

SUMMARY

The disclosure is made in view of the above needs and one or more embodiments provide an electronic apparatus capable of performing automated stock management and a control method thereof.

According to embodiments of the disclosure, an electronic apparatus includes: a storage compartment; a camera; a memory configured to store a database corresponding to products provided in the storage compartment; and a processor communicably coupled to the camera and the memory to control the electronic apparatus. The processor is configured to: control the camera to capture images of one side of the storage compartment; based on identifying that a first product is input to the storage compartment, obtain a first feature of the first product; update the database by storing the first feature in the memory; based on identifying that a second product is output from the storage compartment, obtain a second feature of the second product; identify a product corresponding to the second feature from the database; and update the database based on the product corresponding to the second feature.

The processor may be configured to: obtain at least one second feature by inputting an image of the second product to at least one of a first neural network model, a second neural network model, and a third neural network model that are stored in the memory; identify the product corresponding to the at least one second feature; and update the database based on the product corresponding to the at least one second feature. The first neural network model may be trained based on first training data in which shapes of a plurality of poses of a same product are mapped as a same class. The second neural network model may be trained based on second training data in which different products having at least one of a logo, a shape, or a texture in common are mapped as a same class. The third neural network model may be trained based on third training data in which at least one of a smoothing process, a blur process, chromaticity reduction, or color value reduction is performed with respect to training data in which shapes of the plurality of poses of same product are mapped as same class.

The processor may be configured to: obtain a plurality of second features by inputting the image of the second product to each of the first neural network model, the second neural network model, and the third neural network model; add weights of the plurality of second features; identify a product corresponding to the weight-summed second feature from the database; and update the database based on the product corresponding to the weight-summed second feature.

The processor may be configured to: obtain a plurality of second features by inputting the image of the second product to each of the first neural network model, the second neural network model, and the third neural network model; obtain priorities of the plurality of second features based on priorities of the first neural network model, the second neural network model, and the third neural network model; identify products corresponding to the plurality of second features from the database based on the priorities of the plurality of second features; and update the database based on the products corresponding to the plurality of second features.

The database may include a plurality of features for a plurality of products stored in the storage compartment. The processor may be configured to: identify a similarity between a second feature among the plurality of second features which has a highest priority and each of the plurality of features; and based on a first difference between a first similarity that is a highest similarity and a second similarity that is a second highest similarity among the identified similarities being a first threshold value or more, identify that a product corresponding to the first similarity is output.

The processor may be configured to: based on the first difference being less than the first threshold value, re-identify a similarity between the second feature having a second highest priority and each of the plurality of features; and based on a second difference between a third similarity that is a highest similarity and a fourth similarity that is a second highest similarity among the re-identified similarities being the first threshold value or more, identify that a product corresponding to the third similarity is output.

The database may include a plurality of features for a plurality of products stored in the storage compartment, and the processor may be configured to: obtain a first second feature by inputting the image of the second product to the first neural network model; identify a similarity between the first second feature and each of the plurality of features; based on a difference between a first similarity that is the highest similarity and a second similarity that is a second highest similarity among the identified similarities being a second threshold value or more and the first similarity and the second similarity being a third threshold value or more, identify that a product corresponding to the first similarity is output; based on the difference between the first similarity and the second similarity being less than a second threshold value and the first similarity and the second similarity being the third threshold value or more, obtain a second second feature by inputting the image of the second product to the second neural network model; and update the database by identifying a product corresponding to the second second feature from the database.

The database may include a plurality of features for a plurality of products stored in the storage compartment. The processor may be configured to: obtain a first second feature by inputting the image of the second product to the first neural network model; identify a similarity between the first second feature and each of the plurality of features; based on a highest similarity among the identified similarities being less than a fourth threshold value, obtain a third second feature by inputting the image of the second product to the third neural network model; identify a product corresponding to the third second feature from the database; and update the database based on the product corresponding to the third second feature.

The database may include a plurality of features for a plurality of products stored in the storage compartment. The processor may be configured to, based on a number of the plurality of products being a threshold number or more, perform a remapping operation to reduce a similarity between the plurality of features.

The processor may be configured to: control the camera to capture a plurality of continuously captured images of the one side of the storage compartment; identify a region in a predetermined color from the plurality of continuously captured images; and identify whether a third product is being input to the storage compartment or output from the storage compartment based on movement of the region from the plurality of continuously captured images.

The electronic apparatus may further include a door. The processor may be configured to, based on the door being opened, control the camera to capture the images of the one side of the storage compartment.

According to embodiments of the disclosure, a method for controlling an electronic apparatus includes: capturing images of one side of a storage compartment of the electronic apparatus; based on identifying that a first product is input to the storage compartment, obtaining a first feature of the first product; updating a database for products stored in the storage compartment by storing the first feature in a memory of the electronic apparatus; based on identifying that a second product is output from the storage compartment, obtaining a second feature of the second product; identifying a product corresponding to the second feature from the database; and updating the database based on the product corresponding to the second feature.

The obtaining the second feature may include obtaining at least one second feature by inputting an image of the second product to at least one of a first neural network model, a second neural network model, and a third neural network model. The identifying the product corresponding to the second feature may include identifying a product corresponding to the at least one second feature. The updating the database may include updating the database based on the product corresponding to the at least one second feature. The first neural network model may be trained based on first training data in which shapes of a plurality of poses of a same product are mapped as a same class, the second neural network model may be trained based on second training data in which different products having at least one of a logo, a shape, or a texture in common are mapped as a same class, and the third neural network model may be trained based on third training data in which at least one of a smoothing process, a blur process, chromaticity reduction, or color value reduction is performed with respect to training data in which shapes of the plurality of poses of same product are mapped as the same class.

The obtaining the second feature may include: obtaining a plurality of second features by inputting the image of the second product to each of the first neural network model, the second neural network model, and the third neural network model; and adding weights of the plurality of second features. The identifying the product corresponding to the second feature may include identifying a product corresponding to the weight-summed second feature from the database, and the updating the database may be performed based on the product corresponding to the weight-sum second feature.

The obtaining the second feature may include obtaining a plurality of second features by inputting the image of the second product to each of the first neural network model, the second neural network model, and the third neural network model. The identifying the product corresponding to the second feature may include obtaining priorities of the plurality of second features based on priorities of the first neural network model, the second neural network model, and the third neural network model, and the updating the database based on the product corresponding to the second feature may include updating the database based on the products corresponding to the plurality of second features from the database based on the priorities of the plurality of second features.

According to embodiments of the disclosure, a non-transitory computer readable storage medium having instructions stored thereon is provided. The instructions, when executed by a processor of an electronic apparatus, cause the electronic apparatus to: control a camera to capture images of one side of a storage compartment; based on identifying that a first product is input to the storage compartment, obtain a first feature of the first product; update a database based on the first feature; based on identifying that a second product is output from the storage compartment, obtain a second feature of the second product; identify a product corresponding to the second feature from the database; and update the database based on the product corresponding to the second feature.

According to embodiments of the disclosure, an electronic apparatus includes: a memory configured to store a database corresponding to products; and a processor configured to: obtain images of one side of a storage compartment; based on identifying that a first product is input to the storage compartment, obtain a first feature of the first product; update a database based on the first feature; based on identifying that a second product is output from the storage compartment, obtain a second feature of the second product; identify a product corresponding to the second feature from the database; and update the database based on the product corresponding to the second feature.

The electronic apparatus may further include a camera configured to obtain the images of the one side of the storage compartment.

The processor may be further configured to control the camera to obtain the images of the one side of the storage compartment based on an electronic signal indicating the storage compartment is accessed. The electronic signal may be generated by a sensor.

The processor may be configured to: obtain at least one second feature by inputting an image of the second product to at least one of a first neural network model, a second neural network model, and a third neural network model that are stored in the memory; identify a product corresponding to the at least one second feature; and update the database based on the product corresponding to the at least one second feature. The first neural network model may be trained based on first training data in which shapes of a plurality of poses of a same product are mapped as a same class, the second neural network model may be trained based on second training data in which different products having at least one of a logo, a shape, or a texture in common are mapped as a same class, and the third neural network model may be trained based on third training data in which at least one of a smoothing process, a blur process, chromaticity reduction, or color value reduction is performed with respect to training data in which shapes of the plurality of poses of same product are mapped as same class.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
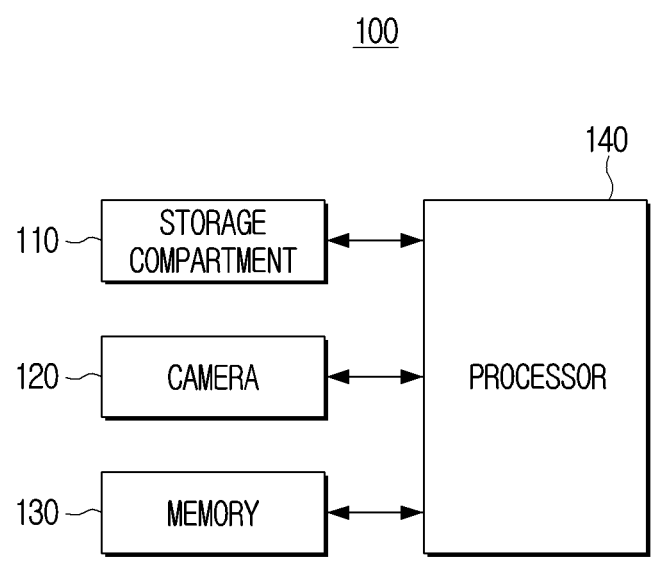
FIG. 1 is a block diagram illustrating a configuration of an electronic apparatus according to an embodiment.

Hereinafter, embodiments will be described in greater detail with reference to the drawings. The embodiments may be diversely modified. Accordingly, specific embodiments are illustrated in the drawings and are described in detail in the detailed description. However, it is to be understood that the present disclosure is not limited to the embodiments illustrated and described herein, but includes all modifications, equivalents, and substitutions without departing from the scope and spirit of the present disclosure. Also, well-known functions or constructions are not described in detail since they would obscure the disclosure with unnecessary detail.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms "1st" or "first" and "2nd" or "second" may use corresponding components regardless of importance or order and are used to distinguish a component from another component without limiting the components.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

In this disclosure, a term "user" may refer to a person using an electronic apparatus or an apparatus using an electronic apparatus (e.g., an artificial intelligence electronic apparatus).

FIG. 1 is a block diagram illustrating a configuration of an electronic apparatus 100 according to an embodiment.

Referring to FIG. 1, the electronic apparatus 100 may include a storage compartment 110, a camera 120, a memory 130, and a processor 140.

The electronic apparatus 100 is an apparatus which stores products, and may be a refrigerator, a freezer, a wine cellar, a clothes manager, and the like. However, the electronic apparatus 100 is not limited to these examples and may be any apparatus which stores products.

The storage compartment 110 is a constituent element on which products may be placed, and may have a shelf provided therein or may be an empty space inside the electronic apparatus 100. However, the storage compartment 110 is not limited to these examples and may be any constituent element on which products are able to be placed.

A product may be input or output through one side of the storage compartment 110. For example, the electronic apparatus 100 may further include a door and, when the door is opened, the one side of the storage compartment 110 is opened and the product may be input or output through the opened space. However, the input or output method of a product may vary and the storage compartment 110 may also be implemented in various forms according to the input or output method.

The camera 120 is a constituent element for capturing a still image or a video. The camera 120 may capture a still image at a specific time point or may also capture still images continuously.

The camera 120 may capture one side of the storage compartment 110. For example, the camera 120 may capture one or more images of the one side of the storage compartment 110 to capture images of products being input to or output from the storage compartment 110. However, the camera 120 is not limited to these examples and may capture one or more images of the inside of the storage compartment 110. For example, the camera 120 may capture one or more images of the inside of the storage compartment 110 to obtain one or more images of the products placed inside the storage compartment 110. In addition, the camera 120 may change a capturing direction. For example, the camera 120 may obtain one or more images of the one side of the storage compartment 110 or obtain one or more images of the inside of the storage compartment 110 by changing the capturing direction through a driving unit. The driving unit may include one or more electric motors and gears.

The camera 120 may include a lens, a shutter, an aperture, a solid-state imaging device, an analog front-end (AFE), and timing control circuitry. The shutter may open and close to control a time during which light reflected by a subject enters the camera 120, the aperture may be adjusted to control an amount of light incident to the lens by mechanically increasing or reducing a size of an opening through which light enters the camera 120. When the light reflected by the subject is accumulated as photo-charge, the solid-state imaging device outputs an image by the photocharge as an electric signal. The timing control circuitry may output a timing signal for leading out pixel data of the solid-state imaging device and AFE samples and may digitize the electric signal output from the solid-state imaging device.

The memory 130 may store at least one instruction or module necessary for the operation of the electronic apparatus 100 or the processor 140. Herein, the instruction may instruct the operation of the electronic apparatus 100 or the processor 140 and may be written in machine language which is a language that the computer is able to understand. The one or more instructions may contain a code made by a compiler or a code executable by an interpreter. The module may be a series of instructions set for performing a specific operation in a job unit.

In addition, the memory 130 may store data which is information in a bit or byte unit capable of representing a text, number, image, or the like. For example, the memory 130 may store a database for products stored in the storage compartment 110. Herein, the database ma include a plurality of features for a plurality of products stored in the storage compartment 110. In addition, the memory 130 may store at least one neural network model for identifying a product.

Herein, the neural network model may be configured with a plurality of neural network layers, and each layer may have a plurality of weight values and an operation of the layer may be performed through an operation result of a previous layer and an operation of based on plurality of weight values. Examples of the neural network include convolutional neural network (CNN), a deep neural network (DNN), recurrent neural network (RNN), restricted Boltzmann machine (RBM), deep belief network (DBN), bidirectional recurrent deep neural network (BRDNN), and deep Q-network, but various neural networks may be used in the disclosure, in addition to the neural networks described above. In addition, the neural network model may be configured with an ontology-based data structure expressed in a form where various concepts, conditions, relationships, and consensual knowledge are able to be processed by a computer.

The neural network model may be trained through the electronic apparatus 100 or a separate server/system through various training algorithms. The training algorithm may be a method for training a predetermined target machine (e.g., robot) by using a plurality of pieces of training data to allow the predetermined target device to determine or predict by itself. Examples of the learning algorithm include supervised learning, unsupervised learning, semi-supervised learning, or reinforcement learning, but the learning algorithm of the disclosure is not limited to the above examples, unless otherwise noted.

At least one neural network model for identifying the product may be configured based on deep metric learning (DML) for training to identify products that have the same shape and are placed in a similar feature space.

The memory 130 may be accessed by the processor 140 and reading, recording, editing, deleting, or updating of the instruction, the module, the neural network model, or the data by the processor 140 may be executed.

The processor 140 may generally control the operation of the electronic apparatus 100. Specifically, the processor 140 may be connected to each constituent element of the electronic apparatus 100 to generally control the operation of the electronic apparatus 100. For example, the processor 140 may be connected to constituent elements such as the camera 120, the memory 130, a display (not illustrated), a communication interface (not illustrated), a user interface (not illustrated), or the like to control the operation of the electronic apparatus 100.

According to an embodiment, the processor 140 may be implemented as a digital signal processor (DSP), a microprocessor, or a time controller (TCON). However, the processor 140 is not limited thereto, and the processor 140 may include one or more of a central processing unit (CPU), a microcontroller unit (MCU), a microprocessing unit (MPU), a controller, an application processor (AP), or a communication processor (CP), and an ARM processor or may be defined as the corresponding term. In addition, the processor 140 may be implemented as System on Chip (SoC) or large scale integration (LSI) including the processing algorithm or may be implemented in form of a field programmable gate array (FPGA).

The processor 140 may obtain an image of one side of the storage compartment 110 through the camera 120, and may identify that a first product is input to the storage compartment 110 based on the image. When it is identified that a first product is input to the storage compartment 110, the processor may obtain a first feature of the first product. For example, the processor 140 may obtain a plurality of continuously captured images by capturing images of the one side of the storage compartment 110 through the camera 120. In addition, the processor 140 may identify a region with a predetermined color, for example, a region with a skin color, from the plurality of continuously captured images, and identify the input based on a movement of the identified region from the plurality of continuously captured images. For example, the processor 140 may identify that the identified region moves to the storage compartment 110 and then moves away from the storage compartment 110. When the identified region moves to the storage compartment 110, a product may be identified in a region near the identified region. If the product is not identified in the region near the identified region in the images corresponding to the identified region moving away from the storage compartment 110, the processor may identify that the product is input to the storage compartment 110.

The processor 140 may obtain the first feature of the first product. In the example described above, the processor 140 may identify the product by inputting the region near the identified region to the neural network model and analyzing an output of the neural network model. In addition, the processor 140 may also identify the product by inputting the captured image to the neural network model and analyzing an output of the neural network model. Further, the processor 140 may also identify the product by inputting the plurality of continuously captured images to the neural network model and analyzing an output of the neural network model.

The processor 140 may store the first feature in the memory 130 and update the database. In this regard, the processor 140 may construct the database by storing features of input products.

The processor 140 may obtain one or more images of the one side of the storage compartment 110 through the camera 120 and obtain a second feature of a second product, when it is identified that the second product is output from the storage compartment 110. For example, the processor 140 may obtain a plurality of continuously captured images by capturing images of the one side of the storage compartment 110 through the camera 120. In addition, the processor 140 may identify a region with a predetermined color, for example, a region with a skin color from the plurality of continuously captured images, and identify the output based on a movement of the identified region from the plurality of continuously captured images. For example, the processor 140 may identify that the identified region moves to the storage compartment 110 and then moves away from the storage compartment 110. The processor may identify that the product is output from the storage compartment 110 when the identified region moves to the storage compartment 110 and a product is not identified in a region near the identified region, and the product is identified in the region near the identified region when the identified region subsequently moves away from the storage compartment 110.

The processor 140 may obtain the second feature of the second product. In the example described above, the processor 140 may identify the product by inputting the region near the identified region to the neural network model and analyzing an output of the neural network model. In addition, the processor 140 may also identify the product by inputting the captured image to the neural network model and analyzing an output of the neural network model. Further, the processor 140 may identify the product by inputting the plurality of continuously captured images to the neural network model and analyzing an output of the neural network model.

The processor 140 may update the database according to a product identified using the second feature. For example, the processor 140 may identify the product corresponding to the second feature based on a distance between each of a plurality of features stored in the database and the second feature, and update the database to indicate that the corresponding product has been output.

The memory 130 may further store a first neural network model, a second neural network model, and a third neural network model, and the processor 140 may obtain at least one second feature by inputting an image of the second product to at least one of the first neural network model, the second neural network model, and the third neural network model, and update the database by identifying the product corresponding to the at least one second feature. Herein, the first neural network model may be a model trained based on training data in which shapes of a plurality of poses of the same product are mapped as the same class, the second neural network model may be a model trained based on training data in which different products having at least one of a logo, a shape, or a texture in common are mapped as the same class, and the third neural network model may be a model trained based on training data in which at least one of a smoothing process, a blur process, chromaticity reduction, or color value reduction is performed with respect to training data in which shapes of the plurality of poses of the same product are mapped as the same class.

Herein, the processor 140 may obtain a plurality of second features by inputting the image of the second product to each of the first neural network model, the second neural network model, and the third neural network model, add weights of the plurality of second features, and update the database by identifying a product corresponding to the weight-sum second feature from the database.

In addition, the processor 140 may obtain a plurality of second features by inputting the image of the second product to each of the first neural network model, the second neural network model, and the third neural network model, obtain priority of the plurality of second features based on priority of the first neural network model, the second neural network model, and the third neural network model, and update the database by identifying products corresponding to the plurality of second features from the database based on the priority of the plurality of second features.

For example, the database may include a plurality of features for a plurality of products stored in the storage compartment 110, and the processor 140 may identify a similarity between the second feature having the highest priority and each of the plurality of features, and when a first difference between a first similarity that is the highest similarity and a second similarity that is the second highest similarity among the identified similarities is a first threshold value or more, identify that a product corresponding to the first similarity is output.

In addition, when the first difference is less than the first threshold value, the processor 140 may re-identify a similarity between the second feature having the second highest priority and each of the plurality of features, and when a second difference between a third similarity that is the highest similarity and a fourth similarity that is the second highest similarity among the re-identified similarities is the first threshold value or more, identify that a product corresponding to the third similarity is output.

The database may include a plurality of features for a plurality of products stored in the storage compartment 110, and the processor 140 may obtain a second feature 1 by inputting the image of the second product to the first neural network model, identify a similarity between the second feature 1 and each of the plurality of features, when a difference between a first similarity that is the highest similarity and a second similarity that is the second highest similarity among the identified similarities is a second threshold value or more and the first similarity and the second similarity are a third threshold value or more, identify that a product corresponding to the first similarity is output, when the difference between the first similarity and the second similarity is less than a second threshold value and the first similarity and the second similarity are the third threshold value or more, obtain a second feature 2 by inputting the image of the second product to the second neural network model, and update the database by identifying a product corresponding to the second feature 2 from the database.

In addition, the database may include a plurality of features for a plurality of products stored in the storage compartment 110, and the processor 140 may obtain a second feature 1 by inputting the image of the second product to the first neural network model, identify a similarity between the second feature 1 and each of the plurality of features, when a highest similarity among the identified similarities is less than a fourth threshold value, obtain a second feature 3 by inputting the image of the second product to the third neural network model, and update the database by identifying a product corresponding to the second feature 3 from the database.

The database may include a plurality of features for a plurality of products stored in the storage compartment 110, and when the number of the plurality of products is a threshold number or more, the processor 140 may perform a remapping operation so that the similarity between the plurality of features is reduced.

The electronic apparatus 100 may further include a door. In this case, when the door is opened, the processor 140 may obtain one or more images of the one side of the storage compartment 110 through the camera 120. Through such an operation, the power consumption of the camera 120 may be reduced.

Hereinabove, it is described that the first neural network model to the third neural network model are used, but this is an example and embodiments are not limited thereto. For example, the first neural network model to the third neural network model may be implemented as one neural network model.

Figure 2:
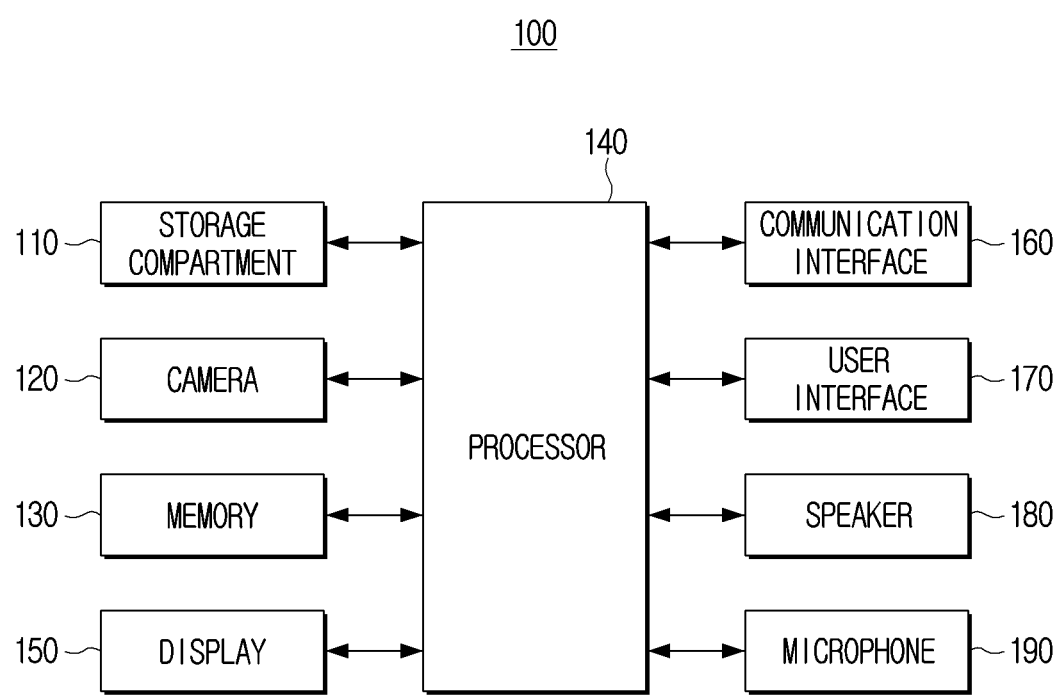
FIG. 2 is a block diagram illustrating a specific configuration of the electronic apparatus according to an embodiment.

FIG. 2 is a block diagram illustrating a specific configuration of the electronic apparatus 100 according to an embodiment. The electronic apparatus 100 may include the storage compartment 110, the camera 120, the memory 130, and the processor 140. In addition, referring to FIG. 2, the electronic apparatus 100 may further include a display 150, a communication interface 160, a user interface 170, a speaker 180, and a microphone 190. The detailed description regarding the parts of the constituent elements illustrated in FIG. 2 which overlap the constituent elements illustrated in FIG. 1 will not be repeated.

The display 150 may be implemented as various types of display such as a Liquid Crystal Display (LCD), Organic Light Emitting Diodes (OLED) display, Plasma Display Panel (PDP), and the like. The display 150 may also include a driving circuit or a backlight unit which may be implemented in a form of a-si TFT, a low temperature poly silicon (LTPS) TFT, or an organic TFT (OTFT). The display 150 may be implemented as a touch screen by combining with a touch sensor, a flexible display, a 3D display, or the like.

The communication interface 160 may be configured to communicate with (i.e., transmit to and receive from) various types of external apparatuses according to various types of communication methods. For example, the electronic apparatus 100 may perform communication with a server through the communication interface 160.

The communication interface 160 may include a Wi-Fi module, a Bluetooth module, an infrared communication module, a wireless communication module, and the like. Herein, each communication module may be implemented as at least one hardware chip.

The Wi-Fi module and the Bluetooth module may communicate by a Wi-Fi method and a Bluetooth method, respectively. In a case of using the Wi-Fi module or the Bluetooth module, various pieces of connection information such as SSID or session key may be transmitted or received first to allow the communication connection by using these, and then various pieces of information may be transmitted and received. The infrared communication module may perform communication according to a technology of infrared communication (infrared Data Association (IrDA)) for transmitting data in a close range wirelessly by using infrared rays between visible rays and millimeter waves.

The wireless communication module may include at least one communication chip for performing communication according to various wireless communication standard such as zigbee, 3rd Generation (3G), 3rd Generation Partnership Project (3GPP), Long Term Evolution (LTE), LTE Advanced (LTE-A), 4th Generation (4G), 5th Generation (5G), and the like, in addition to the above communication method.

The communication interface 160 may include a wired communication interface such as High-Definition Multimedia Interface (HDMI), DisplayPort (DP), Thunderbolt, Universal Serial Bus (USB), RGB, D-SUB, Digital Visual Interface (DVI), or the like.

In addition, the communication interface 160 may include at least one of wired communication modules for performing communication by using a local area network (LAN) module, an Ethernet module, pair cables, a coaxial cable, or an optical fiber cable.

The user interface 170 may be implemented as a device such as a button, a touch pad, a mouse, and a keyboard, and may also be implemented as a touch screen capable of performing the display function and the manipulation input function. The button may be various types of buttons such as a mechanical button, a touch pad, or a wheel formed in any region of a front portion, a side portion, or a rear portion of the appearance of the main body of the electronic device 100.

The speaker 180 is a constituent element which outputs various audio data processed in the processor 140, including various alerts or voice messages.

The microphone 180 is a constituent element for receiving a sound and converting the sound into an audio signal. The microphone 180 may be electrically connected to the processor 140 and generate an electrical signal based on a sound by the control of the processor 140.

For example, the microphone 180 may be formed as an integrated type that is integrated on an upper portion, a front portion, or a side portion of the electronic apparatus 100. In addition, the microphone 180 may be provided in a remote control that is separated from the electronic apparatus 100. In this case, the remote control may receive a sound through the microphone 180 and provide the received sound to the electronic apparatus 100.

The microphone 180 may include various elements such as a microphone for collecting a sound in an analogue form, an amplification circuit for amplifying the collected sound, an A/D conversion circuit for sampling the amplified sound and converting the sound into a digital signal, a filter circuit for removing a noise component from the converted digital signal, and the like.

The microphone 180 may also be implemented in a form of a sound sensor and may be implemented as any type, as long as it is able to collect a sound and generate a signal based on the sound.

Through the above operation, the electronic apparatus 100 identifies the shapes of the products in the input and output process and constructs and updates the stock database, and thus it is advantageous that a comparison range is reduced, maintenance is simple, and the barcode need not be provided. In addition, the electronic apparatus 100 compares the shapes of the products using at least one neural network model, and accordingly, it is advantageous that, although the pose changes, an accuracy is enhanced when determining the similarity of the products.

Hereinafter, the operation of the electronic apparatus 100 will be described in more detail with reference to FIGS. 3 to 12. Particularly, individual embodiments will be described with reference to FIGS. 3 to 12 for convenience of description. However, the individual embodiments of FIGS. 3 to 12 may be practiced in combination.

Figure 3:
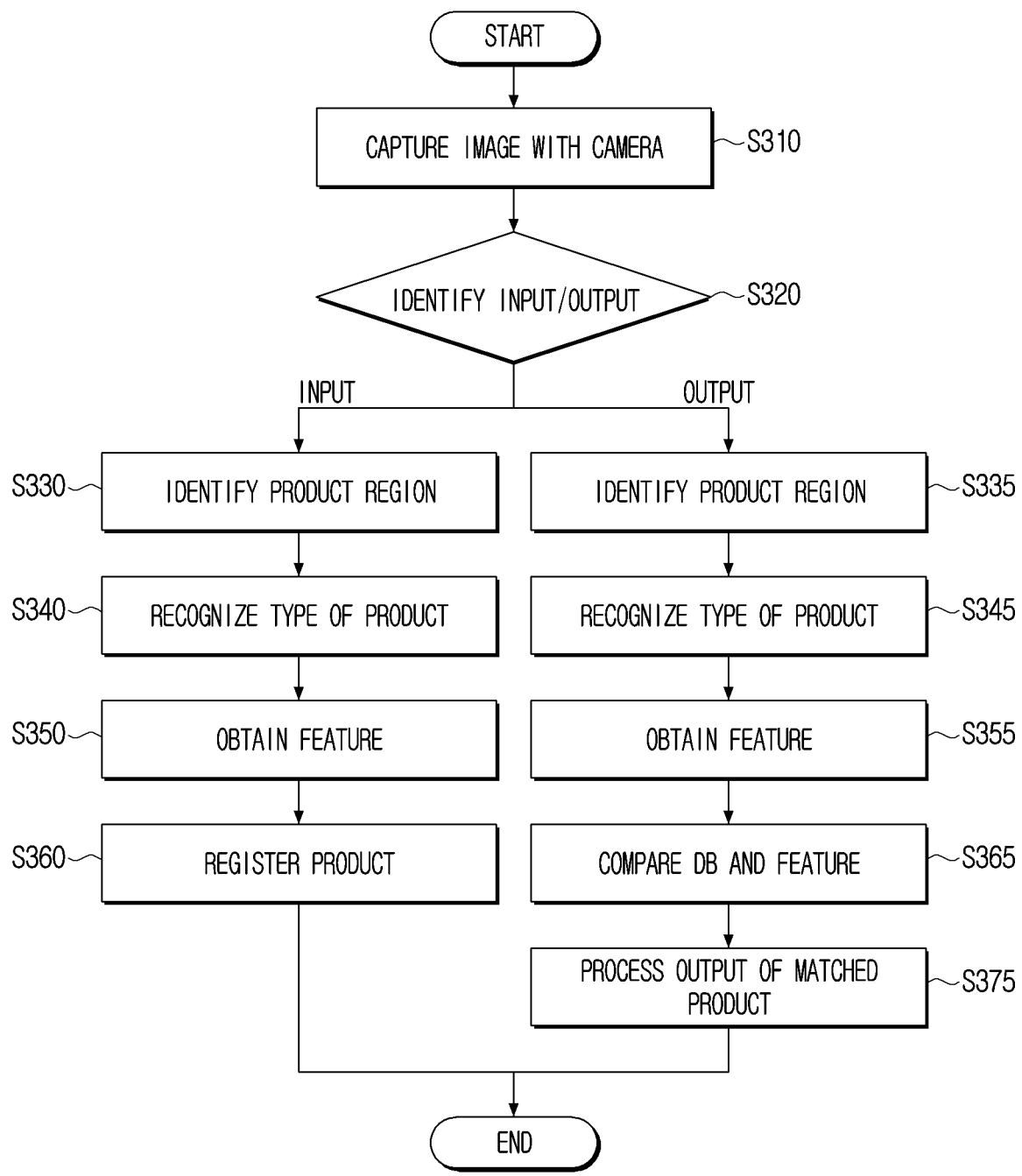
FIG. 3 is a flowchart illustrating an input and output operation of a product according to an embodiment.

FIG. 3 is a flowchart illustrating an input and output operation of a product according to an embodiment.

The processor 140 may obtain one or more images of the one side of the storage compartment 110 through the camera 120 (S310). For example, the electronic apparatus 100 may include a door and the processor 140 may obtain one or more images of the one side of the storage compartment 110 through the camera 120, when the door is opened. In addition, the electronic apparatus 100 may include an infrared sensor disposed on the one side of the storage compartment 110. In this case, the processor 140 may obtain one or more images of the one side of the storage compartment 110 through the camera 120, when a motion in the vicinity of the one side of the storage compartment 110 is detected through the infrared sensor.

The processor 140 may identify the input or output based on the movement of the identified region from the plurality of continuously images obtained through the camera 120. For example, the processor 140 may obtain the plurality of continuously captured images by controlling the camera 120 to continuously capture images of the one side of the storage compartment 110, identify a region with a predetermined color from the plurality of continuously captured images, and identify input and output based on a movement of the identified region from the plurality of continuously captured images. For example, the processor 140 may identify a pixel of a region where the motion is detected from the plurality of continuously captured images, when the number of pixels of the identified region is reduced, identify that a product is input to the storage compartment 110, and when the number of pixels of the identified region is increased, identify that a product is output from the storage compartment 110. In addition, the processor 140 may identify the input or output of the product based on whether the product is identified and then is not identified or is not identified and then is identified in a region in the vicinity of the identified region.

When it is identified that the product is input to the storage compartment 110, the processor 140 may identify a product region (S330) and recognize a type of the product (S340). However, embodiments are not limited thereto, and the processor 140 may identify the product region without the operation of recognizing the type of the product.

The processor 140 may obtain a feature by inputting an image including the product region to at least one neural network model (S350). For example, the processor 140 may obtain approximately one thousand features by inputting the image including the product region to at least one neural network model.

The processor 140 may register a product by a method for adding the feature to the database (S360). In addition, the processor 140 may match the feature with the type of the product and add the same to the database. In addition, the processor 140 may receive a name of the product form a user, match the name of the product with the feature, and add the same to the database.

When it is identified that the product is output from the storage compartment 110, the processor 140 may identify the product region (S335) and recognize the type of the product (S345). However, embodiments are not limited thereto, and the processor 140 may identify the product region without the operation of recognizing the type of the product.

The processor 140 may obtain a feature by inputting the image including the product region to the at least one neural network model (S355). For example, the processor 140 may obtain approximately one thousand features by inputting the image including the product region to at least one neural network model.

The processor 140 may compare each of the plurality of features stored in the database and the obtained feature (S365) and process the output of the matched product (S375).

As described above, the processor 140 constructs only the database for the input products, and thus the process of comparing the output products may be simplified. In addition, the processor 140 does not identify which product the input product is accurately, but extracts the feature of the input product and stores it in the database, and thus, the database for the products is able to be constructed for products that are newly released. In addition, in the related art, information for all products was necessary to identify which product it is accurately, but according to the disclosure, the information for all products is not necessary, which allows for reduced memory usage, reduced storage requirements, reduced processing and reduced power consumption.

Figure 4:
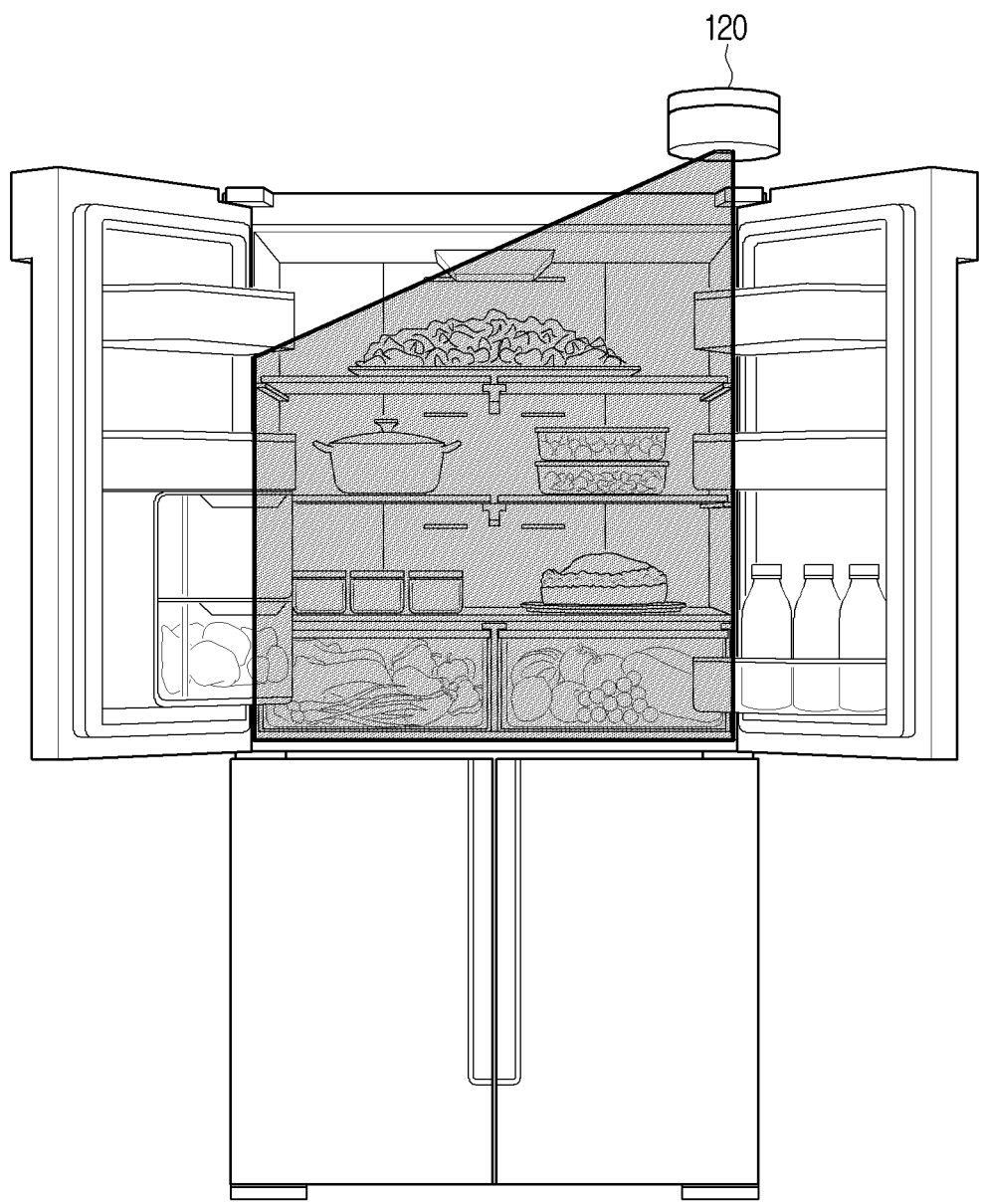
FIG. 4 is a diagram illustrating arrangement of a storage compartment and a camera according to an embodiment.

FIG. 4 is a diagram illustrating arrangement of the storage compartment 110 and the camera 120 according to an embodiment.

In FIG. 4, for convenience of description, it is assumed that the electronic apparatus 100 is a refrigerator. The camera 120 may be disposed on an upper right portion and capture images of the storage compartment 110. Particularly, the camera 120 may perform the capturing according to the opening of the door.

However, embodiments are not limited thereto, and the electronic apparatus 100 may be a freezer, a wine cellar, a clothes manager, or the like and may be any apparatus, as long as it is an apparatus including the storage compartment 110.

In addition, in FIG. 4, the camera 120 is illustrated with a very large size for identification, but in practice, the camera 120 may be small-sized and may be disposed in the vicinity of a hinge.

Figure 5:
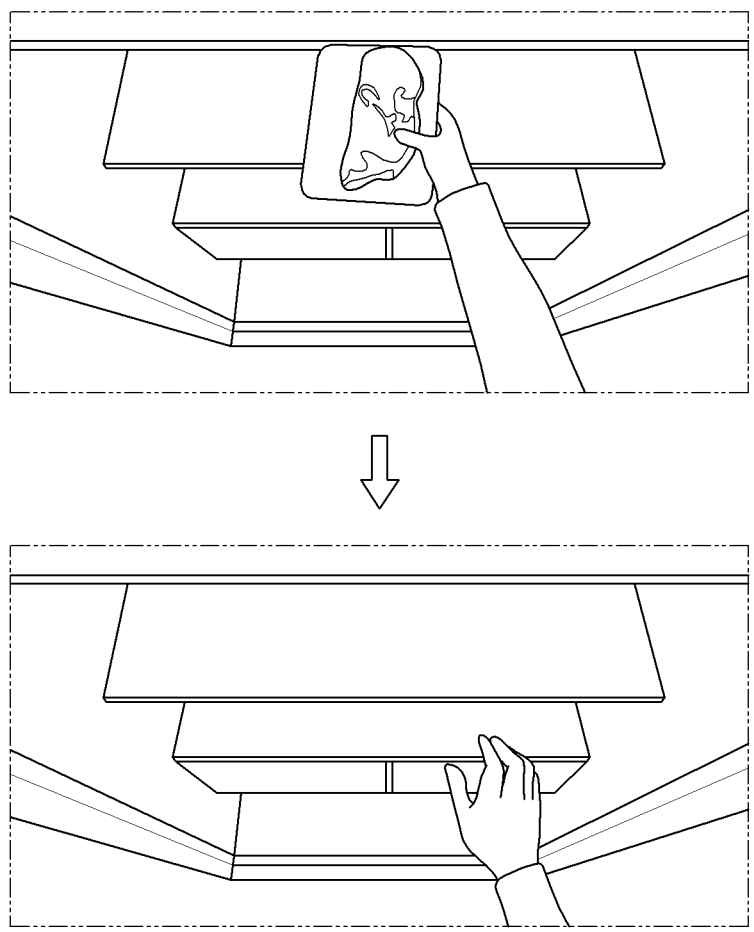
FIG. 5 is a diagram illustrating input of a product according to an embodiment.

FIG. 5 is a diagram illustrating input of a product according to an embodiment.

The processor 140 may obtain a plurality of continuously captured images by capturing images of one side of the storage compartment 110 through the camera 120. For example, the processor 140 may obtain a captured image as an upper diagram of FIG. 5 and then obtain a captured image as a lower diagram of FIG. 5.

The processor 140 may identify a region with a predetermined color from the plurality of continuously captured images. For example, the processor 140 may identify a region with skin color and identify how user's hand (i.e., how the region) moves. In addition, the processor 140 may identify input or output of the product according to whether the product is identified in the region in the vicinity of user's hand. For example, if the product is identified in a region in the vicinity of user's hand as in the upper drawing of FIG. 5 and then the product is not identified in the region in the vicinity of user's hand as in the lower drawing of FIG. 5, the processor 140 may identify that the product is input to the storage compartment 110.

In addition, the processor 140 may identify a pixel of a region where the motion is detected from the plurality of continuously captured images. For example, the processor 140 may identify a user's hand or arm and meat in the upper drawing of FIG. 5, and identify user's hand and arm in the lower drawing of FIG. 5. In addition, when it is identified that the number of pixels of the identified regions (which correspond to the user's hand and arm) is reduced in the lower drawing of FIG. when compared with the upper drawing of FIG. 5, the processor 140 may identify that the product is input to the storage compartment 110.

However, embodiments are not limited thereto, and the processor 140 may identify the input of the product by various methods.

Figure 6:
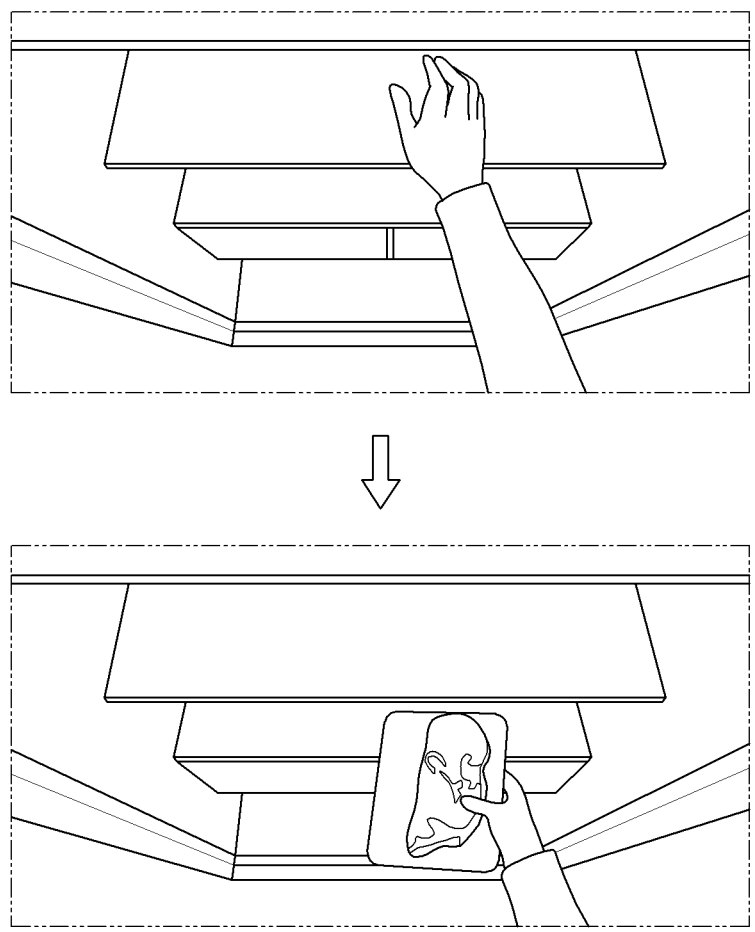
FIG. 6 is a diagram illustrating output of a product according to an embodiment.

FIG. 6 is a diagram illustrating output of a product according to an embodiment.

The processor 140 may obtain the plurality of continuously captured images by controlling the camera 120 to continuously capture images of the one side of the storage compartment 110. For example, the processor 140 may obtain the captured image as in an upper drawing of FIG. 6 and then obtain a captured image as in a lower drawing of FIG. 6.

The processor 140 may identify the region with the predetermined color from the plurality of continuously captured images. For example, the processor 140 may identify how user's hand moves by identifying the region with skin color. In addition, the processor 140 may identify the input or output of the product according to whether the product is identified in the region in the vicinity of user's hand. For example, when the product is not identified in the region in the vicinity of user's hand as in the upper drawing of FIG. 6 and then the product is identified in the region in the vicinity of user's hand as in the lower drawing of FIG. 6, the processor 140 may identify that the product is output from the storage compartment 110.

In addition, the processor 140 may identify a pixel of the region where the motion is detected from the plurality of continuously captured images. For example, the processor 140 may identify user's hand and arm in the upper drawing of FIG. 6 and identify user's hand and arm and the meat in the lower drawing of FIG. 6. In addition, when it is identified that the number of pixels of the identified regions is increased in the lower drawing of FIG. 6 more than the upper drawing of FIG. 6, the processor 140 may identify that the product is output from the storage compartment 110.

However, embodiments are not limited thereto, and the processor 140 may identify the input of the product by various methods.

Figure 7:
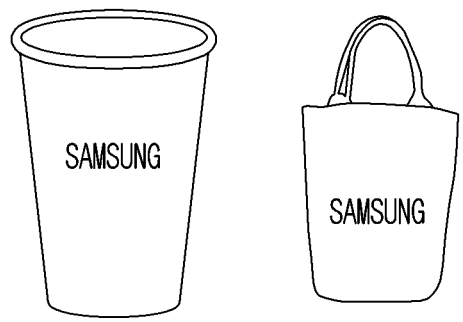
FIGS. 7 to 9 are diagrams illustrating a similarity determination method according to various embodiments.
Figure 8:
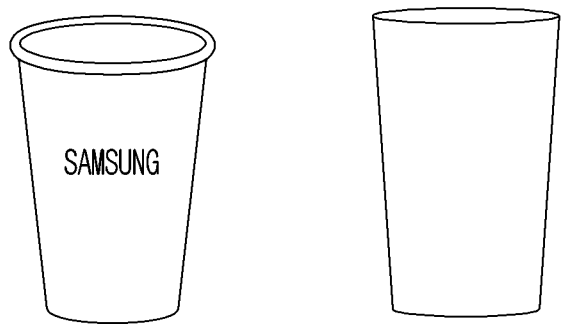
Figure 9:
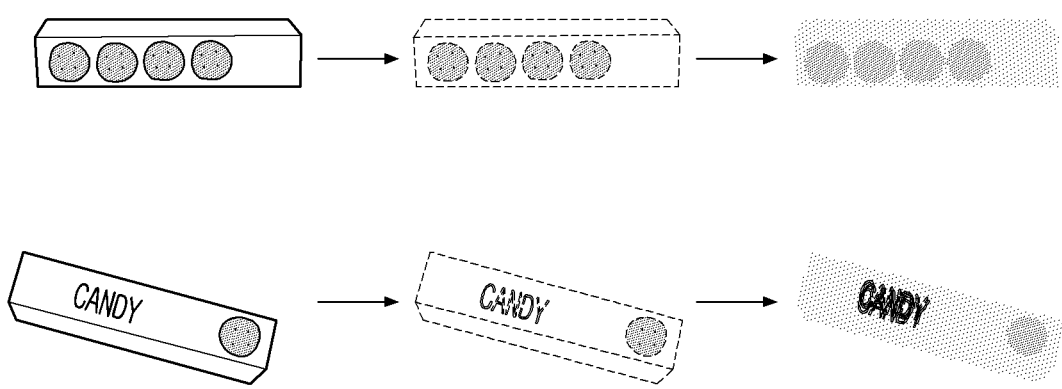

FIGS. 7 to 9 are diagrams illustrating a similarity determination method according to various embodiments.

The memory 130 may store the first neural network model, the second neural network model, and the third neural network model. Here, the first neural network model is a model trained based on training data in which shapes of a plurality of poses of the same product are mapped as the same class.

The second neural network model may be a model trained based on training data in which different products having at least one of a logo, a shape, or a texture in common are mapped as the same class, and may be a model which extracts a feature based on minor features, compared to those of the first neural network model.

The third neural network model may be a model trained based on training data in which at least one of a smoothing process, a blur process, chromaticity reduction, or color value reduction is performed with respect to the training data in which the shapes of the plurality of poses of the same product are mapped as the same class, and may be a model which extracts a feature based on general features, compared to those of the first neural network model.

The processor 140 may obtain at least one feature by inputting the image of the product to at least one of the first neural network model, the second neural network model, or the third neural network model, and update the database by identifying a product corresponding to the at least one feature.

Specifically, the processor 140 may obtain a plurality of features by inputting the image of the product to each of the first neural network model, the second neural network model, and the third neural network model, add weights of the plurality of features, and update the database by identifying a product corresponding to the weight-sum feature from the database.

In addition, the processor 140 may obtain a plurality of features by inputting the image of the product to each of the first neural network model, the second neural network model, and the third neural network model, obtain priority of the plurality of features based on priority of the first neural network model, the second neural network model, and the third neural network model, and update the database by identifying products corresponding to the plurality of features from the database based on the priority of the plurality of features.

For example, the database may include a plurality of features for a plurality of products stored in the storage compartment 110, and the processor 140 may identify a similarity between the feature having the highest priority among the plurality of features corresponding to the product and each of the plurality of features included in the database, and when a first difference between a first similarity that is the highest similarity and a second similarity that is the second highest similarity among the identified similarities is a first threshold value or more, identify that a product corresponding to the first similarity is output. For example, when the priority of the first neural network model is the highest, the processor 140 may identify the similarity between a feature output from the first neural network model and each of the plurality of features included in the database. When one similarity among the plurality of similarities is significantly different from the others, it implies that the product is very similar to one of the plurality of products stored in the storage compartment 110 and different from the others, and the processor 140 may remove the feature for the corresponding feature from the database.

However, when the first difference is less than the first threshold value, the processor 140 may re-identify a similarity between a feature having the second highest priority and each of the plurality of features included in the database. In the above example, when the priority of the second neural network model is the next priority of the first neural network model, if the first difference is less than the first threshold value, the processor 140 may re-identify a similarity between a feature output from the second neural network model and each of the plurality of features included in the database. When the second difference between the third similarity that is the highest similarity and the fourth similarity that is the second highest similarity among the re-identified similarities is the first threshold value or more, the processor 140 may identify that a product corresponding to the third similarity is output. In this regard, when one similarity among the plurality of similarities is significantly different from the others, it implies that the product is very similar to one of the plurality of products stored in the storage compartment 110 and different from the others, and the processor 140 may remove the feature for the corresponding feature from the database. In this regard, the processor 140 may perform the operation of searching for a product having a high similarity by changing the neural network model.

In addition, the database may include a plurality of features for a plurality of products stored in the storage compartment 110, and the processor 140 may obtain a feature 1 by inputting the image of the product to the first neural network model, identify a similarity between the feature 1 and each of the plurality of features, when a difference between a first similarity that is the highest similarity and a second similarity that is the second highest similarity among the identified similarities is a second threshold value or more and the first similarity and the second similarity are a third threshold value or more, identify that a product corresponding to the first similarity is output.

However, the difference between the first similarity and the second similarity may be less than the second threshold value and the first similarity and the second similarity may be the third threshold value or more, and this implies that there may be a high number of products having shapes similar to the product. In this case, the processor 140 may obtain a feature 2 by inputting the image of the product to the second neural network model, and update the database by identifying a product corresponding to the feature 2 from the database. In this regard, because the second neural network model which extracts the feature based on more minor feature is used, the processor 140 may determine a similarity in logo or the like.

In addition, the database may include a plurality of features for a plurality of products stored in the storage compartment 110, and the processor 140 may obtain a feature 1 by inputting the image of the product to the first neural network model, identify a similarity between the feature 1 and each of the plurality of features, when a highest similarity of the identified similarities is less than a fourth threshold value, obtain a feature 3 by inputting the image of the product to the third neural network model, and update the database by identifying a product corresponding to the feature 3 from the database. When the highest similarity of the identified similarities is less than the fourth threshold value, it implies that the pose of the product is significantly changed. Accordingly, because the third neural network model which extracts a feature based on more general features is used, the processor 140 may determine a similarity in a state where the standard of the pose is more relaxed.

In order to describe the above operation with reference to the drawings more specifically, it is assumed that a feature of a bag of FIG. 7 is stored in the storage compartment in advance.

In order to obtain a feature of a cup of FIG. 7, the processor 140 may obtain the feature by inputting an image of the cup to the first neural network model and may compare the feature of the cup with the feature of the bag. In this case, although the shapes of the products are different, a similarity may be obtained at a certain level or more due to a logo or the like. However, because the shapes of the products are different, if there are other products additionally, the similarity may not be significantly different from similarities with other products.

In this case, the processor 140 may obtain the feature by inputting the image of the cup to the second neural network model, and may compare the feature of the cup with the feature of the bag. Because the second neural network model may reflect the logo or the like, a higher similarity may be obtained, and if the other products have different logos, the difference between similarities may be significant.

In FIG. 8, it is assumed that a feature of a cup on the right side is stored in advance.

In order to obtain a feature of a cup on the left side of FIG. 8, the processor 140 may obtain the feature by inputting an image of the cup to the first neural network model and may compare the feature of the cup on the left side of FIG. 8 with the feature of the cup on the right side. In this case, although there is a difference in that one cup has the logo and one cup does not have the logo, the shapes of the products are similar, and therefore a high similarity may be obtained.

In FIG. 9, it is assumed that although the products are the same, the poses (e.g., orientation) thereof are different and minor features are also different due to the different poses.

In this case, the processor 140 may perform at least one of a smoothing process, a blur process, chromaticity reduction, or color value reduction with respect to each of an image of a product on an upper left side and an image of a product on a lower left side, and then obtain each feature by inputting the two image-processed images to the third neural network model. Particularly, although it is identified that the product is output from the storage compartment 110, if the product having a high similarity is not identified, the third neural network model may be used to identify the product.

Figure 10:
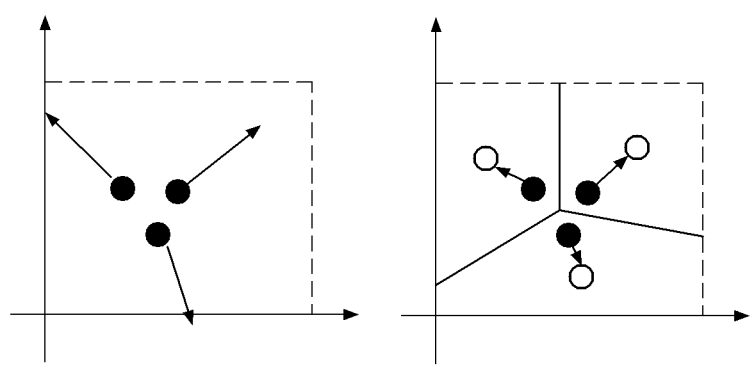
FIG. 10 is a diagram illustrating a remapping operation according to an embodiment.

FIG. 10 is a diagram illustrating a remapping operation according to an embodiment.

The database may include a plurality of features for a plurality of products stored in the storage compartment 110, and when the number of the plurality of products is a threshold number or more, the processor 140 may perform a remapping operation so that a similarity between the plurality of features is reduced.

In addition, when a product having a shape similar to those of the plurality of products stored in the storage compartment 110 is input, the processor 140 may perform the remapping operation so that the similarity between the plurality of features is reduced.

The processor 140 may perform the remapping operation by separating features of different products away from each other from a viewpoint of similarity comparison (e.g., Euclidean distance, cosine similarity, or the like). In this case, the plurality of features included in the database may be converted and applied to a feature extracted from an image of a product to be output after the remapping operation to be used for comparing the similarities.

The processor 140 may perform the remapping operation at an interval of a predetermined time according to the number or the types of the plurality of products stored in the storage compartment 110.

A remapping function used in the remapping operation may be a function that the feature extracted from the product currently stored is dispersed as much as possible among a plurality of predetermined functions. In addition, as illustrated in FIG. 10, the remapping function may be a numeral network model implemented by configuring a transformation formula in that the feature points are dispersed to be away from each other as a simple neural network model.

Figure 11:
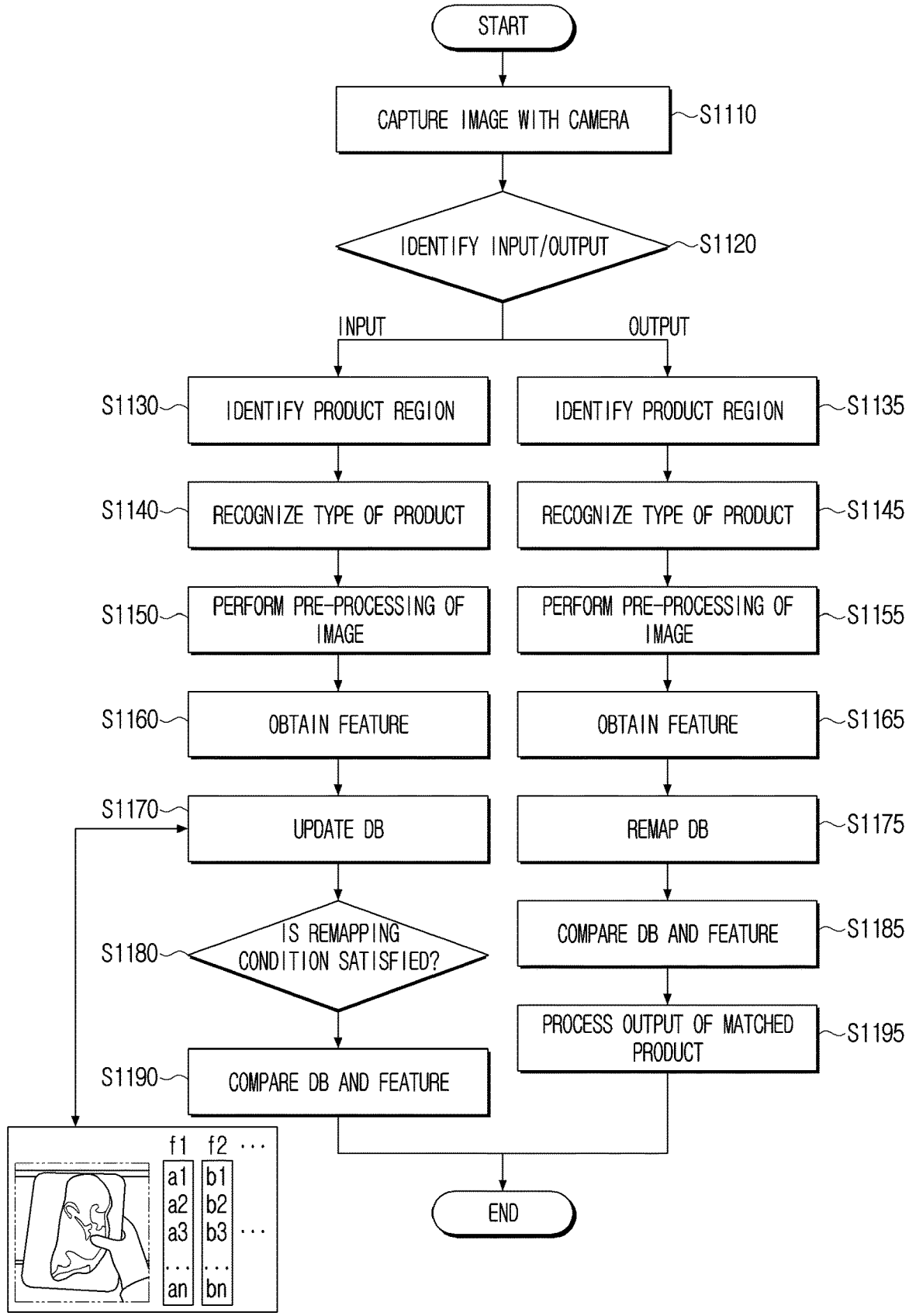
FIG. 11 is a flowchart illustrating an input and output operation of a product according to an embodiment.

FIG. 11 is a flowchart illustrating an input and output operation of a product according to an embodiment.

Some of the operations of FIG. 11 are the same as those in FIG. 3, and thus the description of the overlapped part will not be repeated. In this regard, operations S1130, S1140, S1160, S1135, S1145, S1167 and S1195 as shown in FIG. 11 may substantially correspond to operations S330, S340, S350, S335, S345, S355 and S375 as shown in FIG. 3.

The processor 140 may identify that a product is input to the storage compartment 110 and then perform pre-processing of an image before obtaining a feature (S1150). The processor 140 may then obtain the feature based on the image that has undergone the pre-processing (S1160).

When the feature is obtained, the processor 140 may update the database (S1170). For example, as in the lower left drawing of FIG. 11, features f1, f2, . . . may be obtained from an image of meat and the processor 140 may add the features to the database.

When the database is updated, the processor 140 may identify whether the remapping condition is satisfied (S1180), and when it is identified that it is necessary to perform the remapping, the processor may perform the remapping operation by comparing the database with the features (S1190).

In addition, the processor 140 may identify that a product is output from the storage compartment 110 and then perform pre-processing of an image before obtaining a feature (S1155).

When the features are obtained, the processor 140 may remap the database (S1175). In this regard, the processor 140 may remap the database to identify the similarity more easily, before performing the similarity identification operation.

Figure 12:
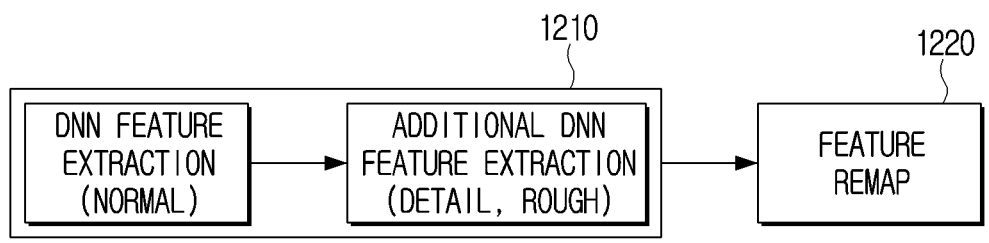
FIG. 12 is a diagram illustrating feature extraction and remapping according to an embodiment.

FIG. 12 is a diagram illustrating feature extraction and feature remapping according to an embodiment.

A feature extraction layer 1210 may include a DNN feature extraction layer and an additional DNN feature extraction layer. The feature extraction layer 1210 may be configured for features of products or general-use purpose. In this regard, the feature extraction layer 1210 may be configured with DNN by considering all products which can be provided.

A feature remapping layer 1220 may be provided using a built-in function, on-device modelling, or by a method such as data analysis or training on a server. The feature remapping layer 1220 may be optimized for user specialization and may be configured with a DNN or a transformation function with particularly simpler configuration.

Figure 13:
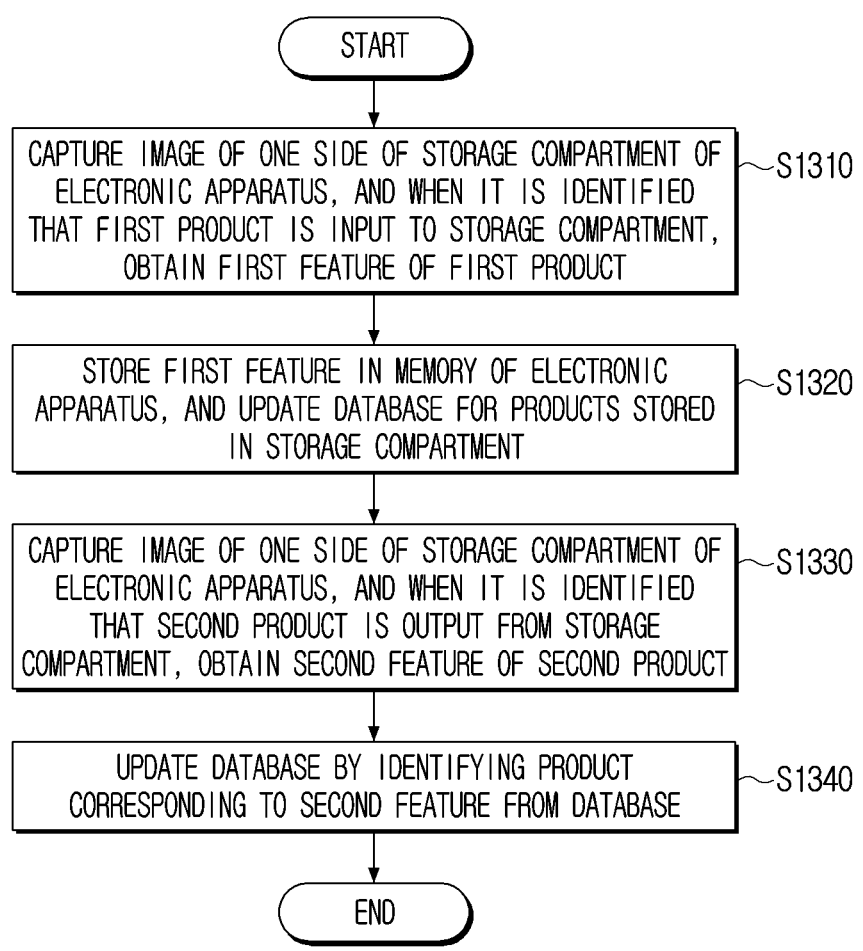
FIG. 13 is a flowchart illustrating a method for controlling the electronic apparatus according to an embodiment.

FIG. 13 is a flowchart illustrating a method for controlling the electronic apparatus according to an embodiment.

First, one or more images of one side of a storage compartment of an electronic apparatus may be captured, and when it is identified that a first product is input to the storage compartment, a first feature of the first product may be obtained (S1310). The first feature may be stored in a memory of the electronic apparatus, and a database for products stored in the storage compartment may be updated (S1320). One or more additional images of the one side of the storage compartment may be captured, and when it is identified that a second product is output from the storage compartment, a second feature of a second product is obtained (S1330). The database may be updated by identifying a product corresponding to the second feature from the database (S1340).

The obtaining the second feature (S1330) may include obtaining at least one second feature by inputting an image of a second product to at least one of a first neural network model, a second neural network model, or a third neural network model. The updating the database by identifying the product corresponding to the second feature (S1340) may include updating the database by identifying the product corresponding to the at least one second feature, the first neural network model may be a model trained based on training data in which shapes of a plurality of poses of same product are mapped as the same class, the second neural network model may be a model trained based on training data in which different products having at least one of a logo, a shape, or a texture in common are mapped as the same class, and the third neural network model may be a model trained based on training data in which at least one of a smoothing process, a blur process, chromaticity reduction, or color value reduction is performed with respect to training data in which shapes of the plurality of poses of same product are mapped as the same class.

The obtaining the second feature (S1330) may include obtaining a plurality of second features by inputting the image of the second product to each of the first neural network model, the second neural network model, and the third neural network model, and adding weights of the plurality of second features. The updating the database by identifying the product corresponding to the second feature (S1340) may include updating the database by identifying a product corresponding to the weight-sum second feature from the database.

In addition, the obtaining the second feature (S1330) may include obtaining a plurality of second features by inputting the image of the second product to each of the first neural network model, the second neural network model, and the third neural network model. The updating the database by identifying the product corresponding to the second feature (S1340) may include obtaining priority of the plurality of second features based on priority of the first neural network model, the second neural network model, and the third neural network model, and updating the database by identifying products corresponding to the plurality of second features from the database based on the priority of the plurality of second features.

Herein, the database may include a plurality of features for a plurality of products stored in the storage compartment, and the updating the database by identifying the product corresponding to the second feature (S1340) may include identifying a similarity between the second feature having the highest priority and each of the plurality of features, and based on a first difference between a first similarity that is the highest similarity and a second similarity that is the second highest similarity among the identified similarities being a first threshold value or more, identifying that a product corresponding to the first similarity is output.

In addition, the updating the database by identifying the product corresponding to the second feature (S1340) may include, based on the first difference being less than the first threshold value, re-identifying a similarity between the second feature having the second highest priority and each of the plurality of features, and based on a second difference between a third similarity that is the highest similarity and a fourth similarity that is the second highest similarity among the re-identified similarities being the first threshold value or more, identifying that a product corresponding to the third similarity is output.

The database may include a plurality of features for a plurality of products stored in the storage compartment, and the obtaining the second feature (S1330) may include obtaining a second feature 1 by inputting the image of the second product to the first neural network model. The updating the database by identifying the product corresponding to the second feature (S1340) may include identifying a similarity between the second feature 1 and each of the plurality of features, based on a difference between a first similarity that is the highest similarity and a second similarity that is the second highest similarity among the identified similarities being a second threshold value or more and the first similarity and the second similarity being a third threshold value or more, identifying that a product corresponding to the first similarity is output, based on the difference between the first similarity and the second similarity being less than a second threshold value and the first similarity and the second similarity being the third threshold value or more, obtaining a second feature 2 by inputting the image of the second product to the second neural network model, and updating the database by identifying a product corresponding to the second feature 2 from the database.

The database may include a plurality of features for a plurality of products stored in the storage compartment. The obtaining the second feature (S1330) may include obtaining a second feature 1 by inputting the image of the second product to the first neural network model, and the updating the database by identifying the product corresponding to the second feature (S1340) may include identifying a similarity between the second feature 1 and each of the plurality of features, based on a highest similarity among the identified similarities being less than a fourth threshold value, obtaining a second feature 3 by inputting the image of the second product to the third neural network model, and updating the database by identifying a product corresponding to the second feature 3 from the database.

The database may include a plurality of features for a plurality of products stored in the storage compartment, and the control method may further include, based on the number of the plurality of products being a threshold number or more, performing a remapping operation so that the similarity between the plurality of features is reduced.

According to various embodiments of the disclosure, the electronic apparatus identifies the shapes of the products in the input and output process, and constructs and updates the stock database. Thus, a comparison range may be reduced, maintenance may be simplified, and products may be tracked even without a barcode.

In addition, the electronic apparatus compares the shapes of the products using at least one neural network model, and accordingly, it is advantageous that, although the pose changes, an accuracy is enhanced when determining the similarity of the products.

According to an embodiment of the disclosure, various embodiments of the disclosure may be implemented as software including instructions stored in machine (e.g., computer) readable storage media. The machine is an apparatus which invokes instructions stored in the storage medium and is operated according to the invoked instructions, and may include an electronic apparatus (e.g., electronic apparatus 100) according to the disclosed embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

According to an embodiment of the disclosure, the embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as separate software modules. Each of the software modules may perform one or more functions and operations described in this specification.

Computer instructions for executing processing operations according to the embodiments of the disclosure descried above may be stored in a non-transitory computer-readable medium. When the computer instructions stored in such a non-transitory computer-readable medium are executed by the processor of a specific machine, the processing operation on the machine according to various embodiments described above may be executed by the specific machine. The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

While aspects of example embodiments have been particularly shown and described, it will be understood that various changes in form and details may be made therein without departing from the spirit and scope of the following claims.

What is claimed is:

1. An electronic apparatus comprising:
a storage compartment;
a camera;
a memory configured to store a database comprising a plurality of features for a plurality of products provided in the storage compartment; and
a processor communicably coupled to the camera and the memory to control the electronic apparatus, wherein the processor is configured to:
control the camera to capture images of one side of the storage compartment;
identify whether a first product is input to the storage compartment based on a change in a number of pixels of a region in which motion is detected in the images;
based on identifying that the first product is input to the storage compartment, obtain a first feature of the first product;
update the database by storing the first feature in the memory;
based on identifying that a second product is output from the storage compartment, obtain a second feature of the second product;
identify a product corresponding to the second feature from the database by comparing the second feature with the plurality of features in the database; and
update the database based on the product corresponding to the second feature.

2. The electronic apparatus according to claim 1, wherein the processor is configured to:
obtain at least one second feature by inputting an image of the second product to at least one of a first neural network model, a second neural network model, and a third neural network model that are stored in the memory;
identify the product corresponding to the at least one second feature; and
update the database based on the product corresponding to the at least one second feature,
wherein the first neural network model is trained based on first training data in which shapes of a plurality of poses of a same product are mapped as a same class,
wherein the second neural network model is trained based on second training data in which different products having at least one of a logo, a shape, or a texture in common are mapped as a same class, and
wherein the third neural network model is trained based on third training data in which at least one of a smoothing process, a blur process, chromaticity reduction, or color value reduction is performed with respect to training data in which shapes of the plurality of poses of same product are mapped as same class.

3. The electronic apparatus according to claim 2, wherein the processor is configured to:
obtain a plurality of second features by inputting the image of the second product to each of the first neural network model, the second neural network model, and the third neural network model;
add weights of the plurality of second features;
identify a product corresponding to the weight-summed second feature from the database; and
update the database based on the product corresponding to the weight-summed second feature.

4. The electronic apparatus according to claim 2, wherein the processor is configured to:
obtain a plurality of second features by inputting the image of the second product to each of the first neural network model, the second neural network model, and the third neural network model;
obtain priorities of the plurality of second features based on priorities of the first neural network model, the second neural network model, and the third neural network model;
identify products corresponding to the plurality of second features from the database based on the priorities of the plurality of second features; and
update the database based on the products corresponding to the plurality of second features.

5. The electronic apparatus according to claim 4,
wherein and the processor is configured to:
identify a similarity between a second feature among the plurality of second features which has a highest priority and each of the plurality of features; and
based on a first difference between a first similarity that is a highest similarity and a second similarity that is a second highest similarity among the identified similarities being a first threshold value or more, identify that a product corresponding to the first similarity is output.

6. The electronic apparatus according to claim 5, wherein the processor is configured to:
based on the first difference being less than the first threshold value, re-identify a similarity between the second feature having a second highest priority and each of the plurality of features; and
based on a second difference between a third similarity that is a highest similarity and a fourth similarity that is a second highest similarity among the re-identified similarities being the first threshold value or more, identify that a product corresponding to the third similarity is output.

7. The electronic apparatus according to claim 2,
wherein the processor is configured to:
obtain a first second feature by inputting the image of the second product to the first neural network model;
identify a similarity between the first second feature and each of the plurality of features;
based on a difference between a first similarity that is a highest similarity and a second similarity that is a second highest similarity among the identified similarities being a second threshold value or more and the first similarity and the second similarity being a third threshold value or more, identify that a product corresponding to the first similarity is output;
based on the difference between the first similarity and the second similarity being less than the second threshold value and the first similarity and the second similarity being the third threshold value or more, obtain a second second feature by inputting the image of the second product to the second neural network model; and update the database by identifying a product corresponding to the second second feature from the database.

8. The electronic apparatus according to claim 2, wherein the processor is configured to:
obtain a first second feature by inputting the image of the second product to the first neural network model;
identify a similarity between the first second feature and each of the plurality of features;
based on a highest similarity among the identified similarities being less than a fourth threshold value, obtain a third second feature by inputting the image of the second product to the third neural network model;
identify a product corresponding to the third second feature from the database; and
update the database based on the product corresponding to the third second feature.

9. The electronic apparatus according to claim 1, wherein the processor is configured to, based on a number of the plurality of products being a threshold number or more, perform a remapping operation to reduce a similarity between the plurality of features.

10. The electronic apparatus according to claim 1, wherein the processor is configured to:
control the camera to capture a plurality of continuously captured images of the one side of the storage compartment;
identify a region in a predetermined color from the plurality of continuously captured images; and
identify whether a third product is being input to the storage compartment or output from the storage compartment based on movement of the region from the plurality of continuously captured images.

11. The electronic apparatus according to claim 1, further comprising a door,
wherein the processor is configured to, based on the door being opened, control the camera to capture the images of the one side of the storage compartment.

12. A method for controlling an electronic apparatus, the method comprising:
capturing images of one side of a storage compartment of the electronic apparatus;
identifying whether a first product is input to the storage compartment based on a change in a number of pixels of a region in which motion is detected in the images;
based on identifying that the first product is input to the storage compartment, obtaining a first feature of the first product;
updating a database comprising a plurality of features for a plurality of products stored in the storage compartment by storing the first feature in a memory of the electronic apparatus;
based on identifying that a second product is output from the storage compartment, obtaining a second feature of the second product;
identifying a product corresponding to the second feature from the database by comparing the second feature with the plurality of features in the database; and
updating the database based on the product corresponding to the second feature.

13. The method according to claim 12, wherein the obtaining the second feature comprises obtaining at least one second feature by inputting an image of the second product to at least one of a first neural network model, a second neural network model, and a third neural network model,
wherein the identifying the product corresponding to the second feature comprises identifying a product corresponding to the at least one second feature,
wherein the updating the database comprises updating the database based on the product corresponding to the at least one second feature,
wherein the first neural network model is trained based on first training data in which shapes of a plurality of poses of a same product are mapped as a same class,
wherein the second neural network model is trained based on second training data in which different products having at least one of a logo, a shape, or a texture in common are mapped as a same class, and
wherein the third neural network model is trained based on third training data in which at least one of a smoothing process, a blur process, chromaticity reduction, or color value reduction is performed with respect to training data in which shapes of the plurality of poses of same product are mapped as the same class.

14. The method according to claim 13, wherein the obtaining the second feature comprises:
obtaining a plurality of second features by inputting the image of the second product to each of the first neural network model, the second neural network model, and the third neural network model; and
adding weights of the plurality of second features,
wherein the identifying the product corresponding to the second feature comprises identifying a product corresponding to the weight-summed second feature from the database, and
wherein the updating the database is performed based on the product corresponding to the weight-sum second feature.

15. The method according to claim 13, wherein the obtaining the second feature comprises obtaining a plurality of second features by inputting the image of the second product to each of the first neural network model, the second neural network model, and the third neural network model,
wherein the identifying the product corresponding to the second feature comprises obtaining priorities of the plurality of second features based on priorities of the first neural network model, the second neural network model, and the third neural network model, and
wherein the updating the database based on the product corresponding to the second feature comprises updating the database based on the products corresponding to the plurality of second features from the database based on the priorities of the plurality of second features.

16. An electronic apparatus comprising:
a memory configured to store a database comprising a plurality of features for a plurality of products; and
a processor configured to:
obtain images of one side of a storage compartment;
identify whether a first product is input to the storage compartment based on a change in a number of pixels of a region in which motion is detected in the images;
based on identifying that the first product is input to the storage compartment, obtain a first feature of the first product;
update the database based on the first feature;
based on identifying that a second product is output from the storage compartment, obtain a second feature of the second product;
identify a product corresponding to the second feature from the database by comparing the second feature with the plurality of features in the database; and update the database based on the product corresponding to the second feature.

17. The electronic apparatus according claim 16, further comprising a camera configured to obtain the images of the one side of the storage compartment.

18. The electronic apparatus according to claim 17, wherein the processor is further configured to control the camera to obtain the images of the one side of the storage compartment based on an electronic signal indicating the storage compartment is accessed.

19. The electronic apparatus according to claim 16, wherein the processor is configured to:
 obtain at least one second feature by inputting an image of the second product to at least one of a first neural network model, a second neural network model, and a third neural network model that are stored in the memory;
 identify a product corresponding to the at least one second feature; and
 update the database based on the product corresponding to the at least one second feature,
 wherein the first neural network model is trained based on first training data in which shapes of a plurality of poses of a same product are mapped as a same class,
 wherein the second neural network model is trained based on second training data in which different products having at least one of a logo, a shape, or a texture in common are mapped as a same class, and
 wherein the third neural network model is trained based on third training data in which at least one of a smoothing process, a blur process, chromaticity reduction, or color value reduction is performed with respect to training data in which shapes of the plurality of poses of same product are mapped as same class.

20. The electronic apparatus according to claim 1, further comprising an infrared sensor,
 wherein the processor is configured to, based on movement being detected by the infrared sensor, control the camera to capture the images of the one side of the storage compartment.

\* \* \* \* \*